United States Patent [19]
Witt et al.

[11] Patent Number: 6,144,739
[45] Date of Patent: *Nov. 7, 2000

[54] COMPUTER NETWORK PROTECTION USING CRYPTOGRAPHIC SEALING SOFTWARE AGENTS AND OBJECTS

[75] Inventors: Don Earl Witt; James T. Lynn, both of Mesa, Ariz.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/009,342

[22] Filed: Jan. 20, 1998

[51] Int. Cl.$^7$ ...................................................... H04K 1/00
[52] U.S. Cl. ............................... 380/2; 713/169; 713/170; 380/278; 380/259
[58] Field of Search ............................... 380/2, 4, 6, 278, 380/259; 713/169, 170

[56] References Cited

U.S. PATENT DOCUMENTS

| | | | |
|---|---|---|---|
| 5,208,853 | 5/1993 | Armbruster et al. | 380/4 |
| 5,448,641 | 9/1995 | Pintsov et al. | 380/51 |
| 5,530,757 | 6/1996 | Krawczyk | 380/23 |
| 5,864,624 | 1/1999 | Lukas et al. | 380/25 |
| 5,870,470 | 2/1999 | Johnson et al. | 380/6 |
| 5,933,498 | 8/1999 | Schneck et al. | 380/4 |

OTHER PUBLICATIONS

An article entitled "Defending A Computer System Using Autonomous Agents", by Mark Crosbie and Eugene H. Spafford, Coast Laboratory, Dept. of Computer Sciences, Purdue University, West Lafayette, IN, Jun. 16, 1995.

*Primary Examiner*—Thomas R. Peeso
*Assistant Examiner*—Todd Jack
*Attorney, Agent, or Firm*—Gregory J. Gorrie

[57] ABSTRACT

A method and apparatus for protecting software objects from external modification is described. A cryptographic seal protects the object at the object level and also supports secure inter-object communication. A software object (101) is packaged in a crypto seal (103), which provides a cryptographic code hasher (105) for performing a cryptographic form of hashing on the code of object (101), a crypto seal communications authenticator (107) which authenticates communications received by object (101), a crypto seal encryptor (108) which encrypts communications sent by the object (101), a challenge manager (106) which causes the cryptographic code hasher (105) to perform its hashing function on the code of object (101) periodically and on demand when a challenge message is received, and a communications interface (109) which controls inter-object communication. A system (100) which employs crypto sealed objects includes a crypto seal coordinator (119). Coordinator (119) coordinates activities of all crypto seals (103) in the network and causes each crypto seal (103) to be periodically challenged to perform a hash function on the code of its packaged object. Coordinator (119) is provided with a coordinator authenticator/encryptor (123) which authenticates communications received from crypto seals (103) and encrypts communications sent by coordinator (119), a registry (121) in which the identification and location of each crypto seal (103) is recorded, and a network activity monitor (125) which monitors for excess processing by crypto seals (103).

14 Claims, 2 Drawing Sheets

—PRIOR ART—

COMPUTER NETWORK PROTECTION USING CRYPTOGRAPHIC SEALING SOFTWARE AGENTS AND OBJECTS

FIELD OF THE INVENTION

The present invention pertains generally to computer network protection, and more particularly to computer network protection utilizing cryptographic sealing.

BACKGROUND OF THE INVENTION

Networked computer systems provide convenient sharing of files by multiple users located in different locations. Because of increased connection to such networks, such systems are increasingly vulnerable to attack or corruption by viruses or unauthorized users (e.g., hackers). Protective measures may be taken by installing and operating security monitoring tools which continually monitor and report network statistics. To effectively operate, a security monitoring tool is supplied with a definition of the type of activity that constitutes an intrusion. The security monitoring tool keeps aggregate statistics, including CPU usage, disk I/O and memory usage, and user activity. If the security monitoring tool identifies an intrusion, based on the intrusion definitions, it alerts a system administrator. Accordingly, the security monitoring tool typically does not proactively attempt to stop the security violation. In addition, security monitoring tools are typically quite complex in terms of functionality and size, and thus carry a proportional price tag and performance penalty.

Another approach to providing network security is to provide and invoke protective software agents. A software agent is an autonomous or semi-autonomous, semi-intelligent software program that is situated within a system and senses and acts on its environment over time to pursue an agenda independent of other software agents and to effect what it senses in the future. Additionally, software agents, sometimes called intelligent agents, have attributes of artificial intelligence. Agents are, in fact, often made up of objects. Agents may exhibit weak or strong characteristics.

Weak agents have the properties of autonomy, socialization, reaction, and motivation. Autonomy refers to an agent that operates with little direct intervention and is able to migrate to different platforms. Socialization means that the agent interacts or communicates with other agents. Reaction means that the agent senses changes in its environment and adjust to the changes. Motivation means that the agent affects its environment instead of passively allowing the environment to affect it. Examples of weak software agents include conmercially-available World Wide Web-based agents which act on behalf of the user to search the Web according to user preferences. Some researchers avoid referring to these processes as agents because of their limited perceived intelligence.

Strong agents exhibit one or more of the following properties: mentality, rationality, adaptability. Mentality means that the agent has knowledge, desires, and intentions. Rationality means that the agent performs actions which further its goals. Adaptability means that the agent is capable of learning.

The use of software agents provides, among other things, advantages over the conventional security monitoring tool in that a separate independent agent may be created to monitor a small aspect of the overall network system. Several agents which monitor different aspects of the overall system may then cooperate with one another to provide, in combination, the functionality of a security monitoring tool. Because agents are independent of one another, the implementation is less cumbersome and preferably requires less overall code space. Furthermore, different agents may be added, removed, or modified as necessary to fulfill the requirements of network security. The software agent approach to network security is particularly advantageous because each software agent is independently trainable, efficient in terms of interfacing cleanly with the aspect of the system it is created to monitor, and easily tailored to the network system configuration and functionality. Accordingly, the software agent approach provides a clean, easy to maintain, scalable, and adaptive method for providing network security. One description of this approach is described in a paper titled "Defending a Computer System Using Autonomous Agents" by Mark Crosbie and Eugene H. Spafford, of COAST Laboratory, Department of Computer Sciences, Purdue University, dated Jun. 16, 1995, the contents of which are incorporated herein by reference.

One problem associated with the software agent approach is that although the agents in a multiple-agent security system are more immune to virus or hacker attack since they tend to be distributed across the network system, the independent agents are still vulnerable to attack. Accordingly, a need exists for a method and mechanism for protecting the software agents themselves from unauthorized modification. A need also exists for a method and mechanism for identifying the software agents themselves from unauthorized modification.

Distributed processing systems use the processing power of many connected nodes within a network to process information in parallel and to allow autonomous agents created in one node to migrate to other nodes for processing, often without the knowledge of the human operator. The security risk increases even more when objects are permitted to migrate from one node to another across heterogeneous platforms. Two primary types of distributed processing systems are distributed objects systems and distributed agent systems.

Distributed object systems are software systems using classical object-oriented software, distributed across a network of machines. Objects are software programs which have a type which defines the task the object can do and how it is invoked to perform the task. In a distributed object system, objects can either be local or remote. Local objects reside on one network node, whereas remote objects reside usually on another network node. Design of distributed object systems not only provide scalable computational resources, but also applications which operate robustly over many heterogeneous architectures. Distributed object systems are often developed in compliance with a standard developed by Object Management Group (OMG) called the Common Object Request Broker Architecture (CORBA). OMG is one of the world's largest software consortiums, with over 700 member companies. The core of most distributed object systems is the object request broker (ORB). The ORB facilitates communication between local and remote objects and eliminates many tedious steps when designing distributed applications. Under the CORBA architecture, applications within a distributed heterogeneous environment (i.e., a network having different network nodes with diverse machine, operating system, and programming languages) are easily integrated using the OMG Interface Definition Language (IDL) to define interfaces to objects. IDL allows objects to be written in any language, reside on any platform, and communicate with objects written in other languages, residing on other platforms.

Distributed agent systems are similar to distributed object systems in that they accomplish goals by initiating processes across many nodes on a network. Objects in distributed object systems and agents in distributed agent systems are also vulnerable to attack by viruses or hackers. Accordingly, a need also exists for a method and mechanism for protecting the software objects and agents from unauthorized modification.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION OF THE DRAWINGS

The present invention employs cryptographic (hereinafter "crypto") sealed objects for protection from external modification. The crypto sealing protects the object at the object level and also supports secure inter-object communication. The invention also helps ensure that the crypto seal consumes a minimal amount of processing power while maintaining a minimum confidence level of security. Crypto sealing of objects may be developed as a hierarchy of crypto sealed objects. This allows higher level crypto sealed objects to disable lower crypto sealed objects if an attempt to provide an unauthorized usage on a lower level crypto sealed object is detected. This process provides a more proactive mechanism for destroying the attack while ensuring that critical, higher-level functions are maintained. Crypto sealing of data files is described in U.S. Pat. No. 5,208,853, which is assigned to a common assignee and which is incorporated herein by reference.

Figure 1:
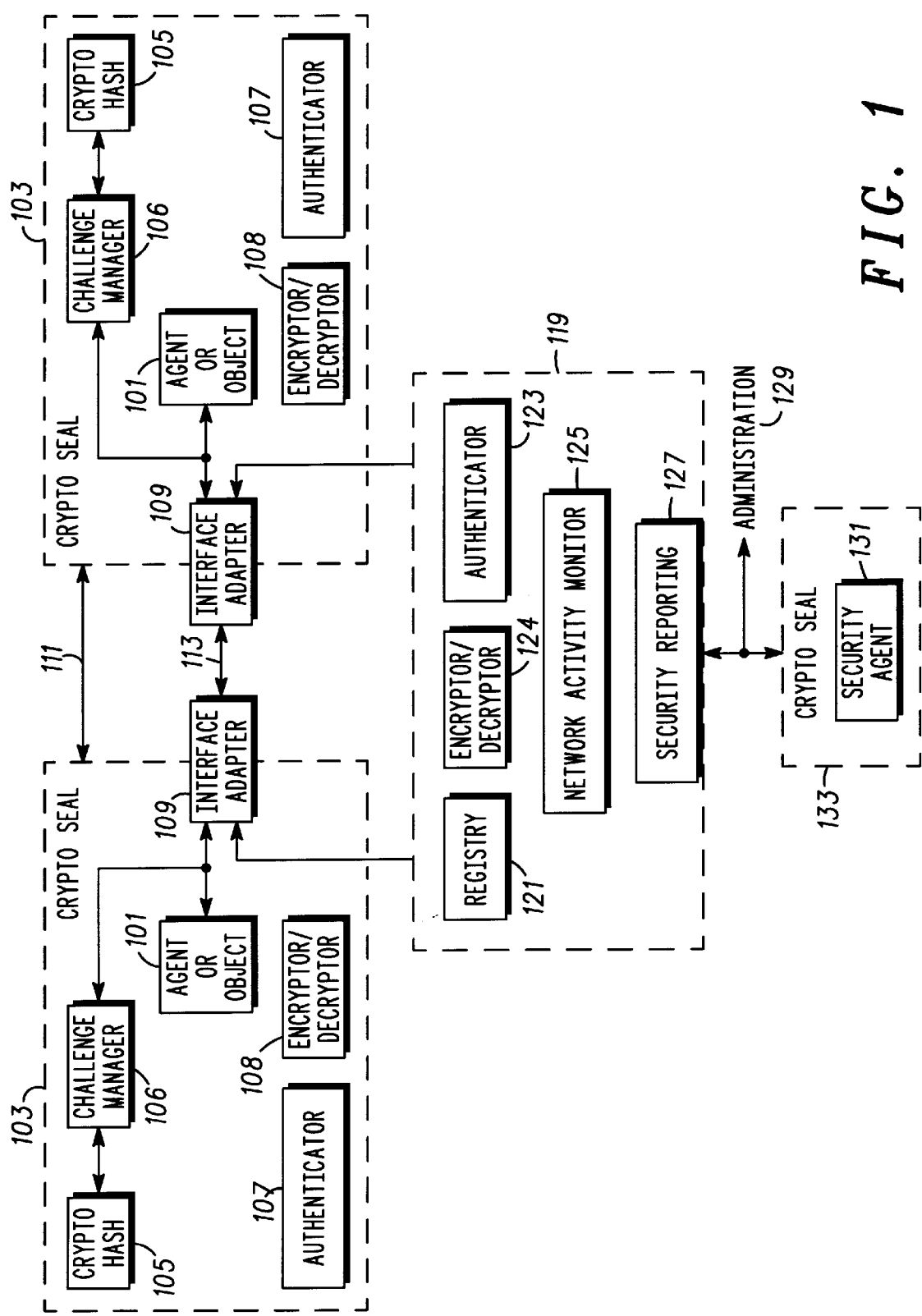
FIG. 1 is a block diagram of a network system in accordance with the principles of present invention.

FIG. 1 is a system 100 illustrating the present invention. As shown in FIG. 1, system 100 includes a plurality of software agents or objects 101, each cryptographically sealed as indicated by a crypto seal 103. As will be appreciated by those skilled in the art, the invention may apply equally to protect not only software agents, but actually any type of software object. Each crypto seal 103 provides a cryptographic code hasher 105 for performing a cryptographic form of hashing on the code of object 101, a crypto seal communications authenticator 107 which authenticates communications received by object 101, a crypto seal encryptor 108 which encrypts communications sent by the object 101, a challenge manager 106 which causes the cryptographic code hasher 105 to perform its hashing function on the code of object 101 periodically and on demand when a challenge message is received, and a communications interface 109 which controls inter-object communication.

System 100 also includes a crypto seal coordinator 119. Coordinator 119 preferably coordinates activities of all crypto seals 103 in the network. Coordinator 119 is provided with a coordinator authenticator 123 which authenticates communications received from crypto seals 103. Coordinator 119 is also provided with a coordinator encryptor 124 which encrypts communications sent by coordinator 119. Coordinator 119 also includes registry 121 in which the identification and location of each crypto seal 103 is recorded, and a network activity monitor 125 which monitors for excess processing by crypto seals 103.

Cryptographic code hasher 105 of crypto seal 103 checks the code of sealed object 101 for unauthorized modification. In one embodiment, cryptographic code hasher 105 preferably obtains an arbitrary length of code and returns a fixed-length value called a hash. Preferably, cryptographic code hasher 105 performs a one-way hash, which makes it difficult to produce the original code from the hash, or to produce a substitute piece of code which will produce the same hash. One-way hash algorithms are known in the art and may include such known algorithms as SHA or MD5. Different existing one-way hash algorithms provide varying levels of security, and vary in computational speed. Accordingly, different hash algorithms may be chosen when implementing crypto seals for objects based on the probability that the object will compromise the system if corrupted. Important factors used in selecting the crypto hash algorithm include the frequency of execution of the object's code and importance of the object's function in the system.

Challenge manager 106 determines when cryptographic code hasher 105 is to perform its hashing function on the code of object 101. Preferably, challenge manager 106 causes cryptographic code hasher 105 to perform its hashing function periodically, based on a programmable periodic rate. The programmable periodic rate may be set by crypto seal coordinator 119, discussed hereinafter, which is preferably programmed according to the criticality of the object it is protecting. Importantly, challenge manager 106 also causes cryptographic code hasher 105 to performs the crypto hash on demand—that is, when another crypto seal 103 or coordinator 119 challenges its crypto seal 103, preferably by sending a challenge message to the communications interface 109 of crypto seal 103. The challenging capability of crypto seals 103 and coordinator 119 is what protects the crypto seals themselves from attack. When a challenge message is received by a crypto seal 103 from coordinator 119 or another crypto seal 103, the cryptographic code hasher 105 of the challenged crypto seal 103 performs a crypto hash and preferably respond with a challenge response message within a predetermined time period. If the challenged crypto seal 103 fails to respond correctly or responds with an intrusion alert, it is considered corrupted, along with the object 101 that it is protecting, and an intrusion indicator is signaled by crypto seal coordinator 119, discussed hereinafter. A challenge and or challenge response may be sent to or received from another crypto seal 103 via interface adaptor 109 over link 113, or may be sent or received over a direct communication link 111, as shown in FIG. 1. A challenge and or challenge response may be sent by coordinator 119 to a crypto seal 103 and a challenge response received by coordinator 119 from a crypto seal 103 via interface adaptor 119 over link 115, or may be sent or received over a direct communication link 117, as shown in FIG. 1.

Crypto seal communications authenticator 107 authenticates communication between sealed objects 101 to verify that the communication is occurring with another authorized crypto sealed object. Crypto seal communications encryptor 108 encrypts the contents of the communication to prevent unauthorized accessors from understanding the message. As an illustration, sealed objects on separate network processing nodes may communicate, and an unauthorized accessor may tap into the network to monitor the communication. Crypto seal communications authenticator 107 prevents the unauthorized listener from sending messages to crypto seals (by authenticating the communication received by the sealed objects 101), and crypto seal communications encryptor 108 prevents the unauthorized listener from understanding the content of the communication (through encryption of the contents of the communication). Critical messages sent between crypto seals 103 or between the coordinator 119 and crypto seals 103 are encrypted and authenticated. The recipient of a message should be able to verify who the message is from and that it has not been modified. Likewise, the message itself should be immune to decoding by a hostile eavesdropper. In a preferred embodiment, public/private key methods are employed to provide authentication. In an embodiment which uses public/private key authentication, each crypto seal 103 has both a public key and a private key. Any crypto seal 103 may look up any other crypto seal's public key via the coordinator 119. However, each crypto seal 103 keeps its private key secret. In this embodiment, public and private keys are algorithmically related: public keys may be used for encrypting, and private keys are used for decrypting. This means that each network processing node in the network system should have a store of private keys which will be assigned to crypto seals 103 as they are created, and the coordinator 119 should have a store of corresponding public keys awaiting the registration of new crypto seals. Although not explicitly discussed, in the preferred embodiments of the present invention, encryptor's 108 and 124 also include means for decryption.

Figure 2:
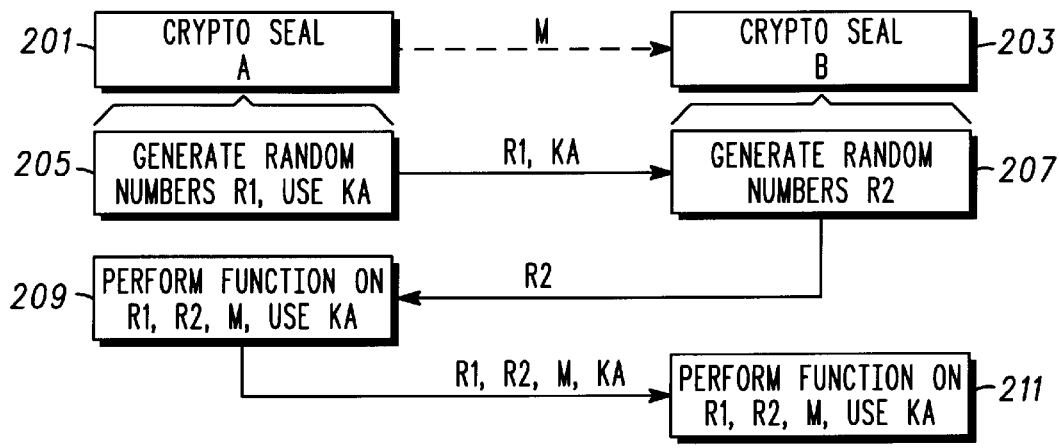
FIG. 2 is a flow diagram illustrating a general public/private key authentication protocol implemented between two crypto seal in accordance with the invention.

FIG. 2 illustrates a general public/private key authentication protocol between a crypto seal 201 and a crypto seal 203. In the illustration of FIG. 2, crypto seal 201 sends a message M to crypto seal 203. As shown in FIG. 2, crypto seal 201 performs a cryptographic function in step 205 on a message by generating random number R1 using its private key KA, and sending the result to crypto seal 203. At step 207, crypto seal 203 generates another random number R2, and sends R2 to crypto seal 201. Crypto seal 201 performs a calculation on both random numbers R1 and R2 and the message M using its private key at step 209, and sends the results to crypto seal 203. Crypto seal 203 performs a calculation at step 211 on the numbers received from crypto seal 201 using crypto seal 201's public key, KAP, to verify that crypto seal 203 knows its private key and to uncover the message M. If crypto seal 203 does indeed know its private key, the message M is authenticated.

Several public/private key algorithms may be used for the protocol described above. An alternative to the protocol described and shown in FIG. 2, which may require less communication bandwidth, is to perform an authenticated session key exchange, such as the Kerberos protocol described in S. P. Miller, B. C. Neuman, J. I Schiller, and J. H. Saltzer, Section E.2.1, "Kerberos Authentication and Authorization System", MIT Project Athena (December, 1987). Employing the Kerberos protocol provides the advantage that the protocol need not be repeated for each message.

Referring back to FIG. 1, communications interface 109 of crypto sealing object 103 is responsible for seamlessly interfacing existing objects 101 to the crypto seal 103 and is responsible for controlling message flow to and from object 101. This allows the crypto seal 103 to take one or more of the following actions in case of detected attack: seal object 101 by blocking all further communications; notify crypto seal coordinator 119 and route all messages to the coordinator 119 for analysis; and/or notify coordinator 119 and disable object 101. Communications interface 109 may also use the crypto seal communications authenticator 107 of crypto seal 103 to authenticate critical communications between objects. Communications interface 109 is customized for each type of agent or object 101.

Coordinator 119 in FIG. 1 coordinates the collective activities of the crypto seals 103. A primary function of coordinator 119 is the registration of all crypto seals 103 in the system. In a preferred embodiment, remote processes should register with coordinator 119 in order to migrate to the protected system. Coordinator 119 preferably creates a crypto seal 103 for the migrating object at the time of registration. When a crypto seal 103 is created, coordinator 119 preferably assigns a private key from a store in the network processing node where the remote object is migrating to and an associated public key held in a store by coordinator 119. Any object 101 which creates other objects 101 should also register them with the coordinator 119. Coordinator 119 maintains a registry 121, which preferably stores crypto seal IDs, and corresponding network address locations, public keys and private keys. Coordinator 119 also informs one or more crypto seals 103 residing on the new crypto seal's network processing node of the location of the new crypto seal so that they may challenge it. Due to the importance of crypto seal coordinator 119 to the crypto sealing process, coordinator 119 should reside on a physically secure platform.

Coordinator 119 includes a security reporting function 127 for security reporting. When a crypto seal 103 fails to respond to a challenge or responds with a fault indicator, security reporting function 127 signals an intrusion indicator, which notifies a system administrator 129 and or one or more security agents 131 or processes. For maximum security, each security agent 131 is also packaged in a crypto seal 133. Crypto seal 133 is preferably identical in functionality to crypto seals 103. Additionally, coordinator 119 may instruct the reporting crypto seal 103 to route all communications to it for analysis. Coordinator 119 may increase the frequency of hash checking and challenging among crypto seals 103 in a given area when a threat in that area is reported. Likewise, coordinator 119 may decrease crypto seal activity in other areas during detected attack in order to relieve network stress.

Network activity monitor 125 of Coordinator 119 monitors the amount of network activity performed on a given network processing node. Preferably, crypto seal processing should not consume more than a few percent of the network's current processing level. To accomplish this, coordinator 119 may periodically send an acknowledge request, or "ping", each individual network processing node and measure the time it takes to respond. Coordinator 119 then issues a command to crypto seals 103 executing on the network processing node to temporarily cease all crypto seal operations. Next, Coordinator 119 pings the network processing node again and measures the response time again. Ping response time is preferably correlated to node and network processing levels. Coordinator 119 preferably incrementally controls crypto seal usage of processing resources by sending object self-hash rate messages, which set the programmed periodic rate, to increase or decrease the frequency of crypto hash checking and challenging among crypto seals. To limit the amount of bandwidth used for sending commands to crypto seals, coordinator 119 preferably uses a multiple-key public-key technique to broadcast messages to several crypto seals 103 at once. In an alternative embodiment, one crypto seal per node is designated as a broadcast seal which is responsible for forwarding commands to the other seals on that node.

Crypto seals may be developed as an hierarchy to provide a more distributed approach to controlling crypto seal resource usage. With this approach, critical objects are assigned crypto seals with higher priority levels. When excess crypto seal processing is detected, higher level crypto sealed objects have the ability to disable lower level crypto sealed objects. The ability to disable lower level crypto sealed objects provides a proactive mechanism for stopping the attack while still preserving the critical functions provided by the higher level crypto sealed objects.

The method and mechanism provided by the present invention is illustrated by examining its application to a distributed object system having a CORBA-based architecture. A CORBA-based system utilizes an object request broker ORB which facilitates communication between objects, and object adapters which adapt the interface of an object to the interface expected by a client caller. The organization of CORBA-based architecture simplifies the integration of crypto sealing technology.

Figure 3:
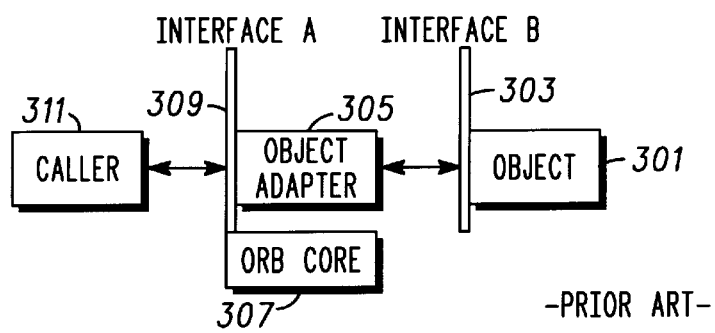
FIG. 3 is a block diagram of a prior art CORBA-based distributed object system.

FIG. 3 is a simplified block diagram of a conventional CORBA-based distributed object system 300. In FIG. 3, an object adapter 305 binds a CORBA object 301 to the ORB core 307. The primary function of object adapter 305 is to adapt the interface 303 of object 301 to that expected by the interface 309 of a caller 311. This is much like the communications interface function 109 of a crypto seal 103 of FIG. 1. Due to object adapter 305, caller 311 need not know the true interface of object 301. As will be appreciated by those skilled in the art, different implementations of object adapter 305 are necessary for each language in which an object 301 is written and may be customized for individual objects. Other functions of object adapter 305 include: object registration with the ORB core 307, generation of object references for CORBA objects, activation of objects if inactive when called, and facilitation of requests to register objects.

Figure 4:
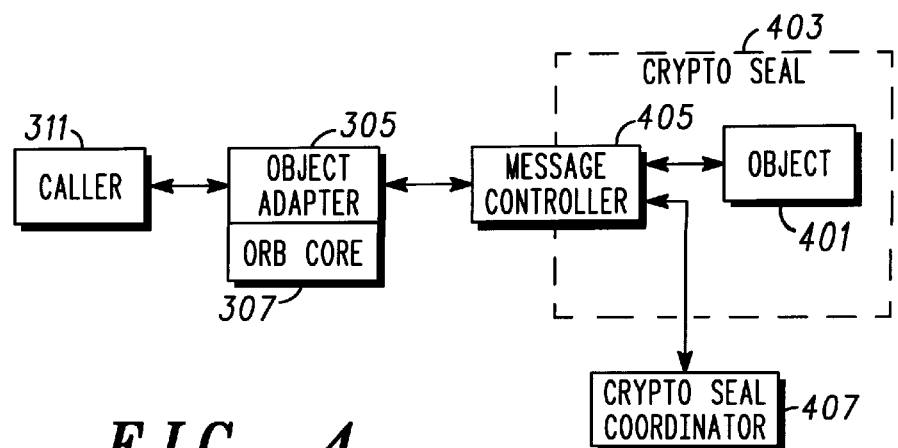
FIG. 4 is a block diagram of a CORBA-based distributed object system in accordance with the invention.

FIG. 4 illustrates the application of crypto sealing to an object 401 in a CORBA-based system 400. As shown in FIG. 4, object 401 is packaged in a crypto seal 403. Furthermore, the communications interface 109 of a crypto seal 103 of FIG. 1 is replaced by a message controller 405, which comprises a subset of the functionality of communications interface 109 described earlier. Message controller 405 preferably requires only a subset of the functionality of communications interface 109 because the CORBA object adapter 305 performs the necessary interface adaptation of the caller 311 to the object 401. Message controller 405 is preferably configured to block messages or route messages to a crypto seal coordinator 407 if an intrusion is detected.

Autonomous agents deployed to monitor a network for attack are, themselves, vulnerable to attack. Crypto sealing of agents, as described herein with respect to generic objects, negates this vulnerability by enforcing periodic cryptographic checking of agent code. Crypto seals protect each other by challenging one another to perform checks. The crypto sealing technology effectively provides a firewall, at the agent or object level, against outside intrusion. The crypto sealing mechanism of the invention is equally applicable to both distributed object systems and to multiple-agent systems to enhance security with minimal impact to network performance.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A cryptographically sealed system that operates within a networked computer system, comprising:

a software object comprised of a software program for monitoring an aspect of the networked computer system;

a communications interface, said communications interface receiving an incoming communication message and indicating if said incoming communication message is a challenge message;

a cryptographic code hasher operable to perform a hashing function, said cryptographic code hasher responsive to said communications interface indicating that said incoming communication message is said challenge message by performing said hashing function on said software object to indicate if said software object has been modified;

an authenticator for authenticating the incoming communication message using a public/private key authentication technique;

a challenge manager operable to activate said cryptographic code hasher in response to said challenge message by causing said cryptographic code hasher to perform said hashing function on said software object, said challenge manager generating a challenge response message indicating if said software object has been modified, transmitting the challenge response message to a cryptographic seal coordinator and inhibiting further communications with the software object when said software object has been modified; and an encryptor for adding security for authentication to the challenge response message, wherein the cryptographic seal coordinator notifies a security agent that the software object has been modified and instructing said communications interface to route communication messages to the cryptographic seal coordinator, wherein the cryptographic seal coordinator includes a cryptographic seal coordinator authenticator for authenticating the challenge response message using said public key/private key authentication technique, wherein the cryptographically sealed system is a first cryptographically sealed system, wherein said software object communicates with a second cryptographically sealed system through the communication interface and generates an outgoing communication message, the second cryptographically sealed system for monitoring another aspect of the networked computer system;

wherein the encryptor of the first cryptographically sealed system encrypts the outgoing communication message;

wherein said communications interface operates to send said encrypted outgoing communication message to the second cryptographically sealed system;

wherein the second cryptographically sealed system includes a second authenticator and a second decryptor for respectfully authenticating and decrypting the outgoing communication message received from the first cryptographically sealed system;

wherein said second authenticator implements said public key/private key authentication technique;

wherein said challenge manager being operable to generate and send a second challenge message to said second cryptographically sealed system, said second challenge message including a portion for authentication by the second cryptographically sealed system;

wherein said challenge manager is operable to periodically activate said cryptographic code hasher to perform said hashing function on said software object, and notify said cryptographic seal coordinator and inhibit further communications with the software object when said hashing function indicates the software object has been modified;

wherein said communications interface determines if said incoming communication message is an object self-hash rate message, and said challenge manager is responsive to said communications interface determining that said incoming communication message is said object self-hash rate message by adjusting the periodicity of said hashing function on said software object.

2. A system in accordance with claim 1, wherein:

the cryptographic seal coordinator comprises:

a network activity monitor for detecting excess processing by said challenge manager in response to the challenge message, and said communications interface is responsive to said network activity monitor to disable communications from said software object if said network activity monitor detects excess processing, the cryptographic seal coordinator having means for notifying a system administrator of said excess processing, said excess processing indicating failure respond to said challenge message.

3. A system in accordance with claim 1, wherein:

said challenge manager is operable to send the second challenge message to the second cryptographically sealed system, the second cryptographically sealed system comprised of a second software object for monitoring the another aspect of the networked computer system, said second challenge message causing the second cryptographically sealed system to perform a hashing function on the second software object to determine if the second software object has been modified.

4. A system in accordance with claim 1, wherein:

said software object comprises a software agent comprised of software objects, the software agent operable to cooperate with other software agents to provide, in combination, functionality of a security monitoring tool for monitoring security aspects of the networked computer system.

5. A method for protecting a software object in a network system, the software object comprising a computer program for monitoring an aspect of the network system, said software object being one of a plurality of software objects that monitor different aspects of the network system and communicate with each other through the network system, said method comprising the steps of:

authenticating communications received from other software objects of the plurality using a public/private key authentication technique;

determining when an incoming message to said object is a challenge message;

in response to receipt of the challenge message, performing a hashing function with a code hasher on said software object to determine if said software object has been modified;

inhibiting communication with said software object when the hashing function indicates that said software object has been modified detecting excess processing during the performing a hashing function step; and disabling communications with the software object when excess processing is detected by the detecting step.

6. A method in accordance with claim 5, further comprising the steps of:

generating a challenge response message in response to receipt of the challenge message indicating when the software object has been modified; and providing the challenge response message to a cryptographic seal coordinator, the cryptographic seal coordinator causing communications directed to the software object to be routed to the cryptographic seal coordinator when the software object has been modified.

7. A method in accordance with claim 6, further comprising the step of:

authenticating said challenge message using said public/private key authentication technique.

8. A method in accordance with claim 7, further comprising the step of:

performing said hashing function on said software object periodically at a periodic rate; and notifying a system administrator when excess processing is detected by the detecting step, wherein said excess processing indicating a failure to respond to said challenge message.

9. A method in accordance with claim 5, further comprising the steps of:

sending a second challenge message to a second software object of the plurality; and encrypting communication messages communicated between software agents of the plurality using public/private key encryption techniques.

10. A multi-agent network security system for providing network security, said system comprising:

a plurality of cryptographically sealed software agents, each software agent of the plurality comprising a computer program operating within the network for monitoring an aspect of a computer network; and a cryptographic seal coordinator in communication with each of the software agents, wherein each software agent is associated with:

a communications interface for receiving incoming communication messages;

an authenticator for authenticating said incoming communication messages using public/private key authentication techniques;

a cryptographic code hasher operable to perform a hashing function on the associated software agent; and a challenge manager responsive to said communications interface causing said associated cryptographic code hasher to perform said hashing function on said associated software agent when an incoming communication message is a challenge message, said cryptographic code hasher indicating if said software agent has been modified, wherein the cryptographic seal coordinator is operable to cause said challenge message to be generated and operable to signal an intrusion indicator when said cryptographic code hasher indicates that said software agent has been modified, wherein as part of providing security for the network, communication messages are exchanged between the software agents of the plurality, wherein received communication messages are authenticated by the receiving software agent's associated authenticator using the public/private key authentication techniques, and wherein sent communication messages are secured by the sending software agent's associated authenticator using the public/private key authentication techniques, and wherein further exchange of communication messages with a software agent of the plurality is disabled when the challenge manager indicates that an associated software agent has been modified, and wherein the cryptographic seal coordinator comprises a network activity monitor for detecting excess processing by said challenge manager in response to the challenge message, and said communications interface is responsive to said network activity monitor to disable communications from said software object if said network activity monitor detects excess processing, and said challenge manager is operable to periodically activate said cryptographic code hasher to perform said hashing function on said software object, and notify said cryptographic seal coordinator and inhibit further communications with the software object when said hashing function indicates the software object has been modified, and said communications interface is operable to determine if said incoming communication message is an object self-hash rate message, and said challenge manager is responsive to said communications interface determining that said incoming communication message is said object self-hash rate message by adjusting the periodicity of said hashing function on said software object.

11. A system in accordance with claim 10, wherein each software agent is further associated with means for disabling communications from said software agent when said challenge manager indicates that said software agent has been modified.

12. A system in accordance with claim 11, comprising:

a second challenge manager;

said cryptographic seal coordinator causing said second challenge manager to generate and send said challenge message to said communications interface.

13. A system in accordance with claim 12, wherein said second challenge manager sends a timeout indicator to said cryptographic seal coordinator if a challenge response message is not received from said software object within a predetermined time period.

14. A system in accordance with claim 10, wherein the cryptographic seal coordinator comprises means for notifying a system administrator of said excess processing, said excess processing indicating failure respond to said challenge message.

* * * * *